US011605996B2

(12) United States Patent
Mashiko et al.

(10) Patent No.: US 11,605,996 B2
(45) Date of Patent: *Mar. 14, 2023

(54) ELECTRICAL DISTRIBUTION MEMBER

(71) Applicant: Hitachi Metals, Ltd., Tokyo (JP)

(72) Inventors: Shinsuke Mashiko, Tokyo (JP);
Kenichi Egami, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 120 days.

This patent is subject to a terminal disclaimer.

(21) Appl. No.: 17/188,996

(22) Filed: Mar. 1, 2021

(65) Prior Publication Data

US 2021/0184533 A1 Jun. 17, 2021

Related U.S. Application Data

(63) Continuation of application No. 16/776,062, filed on Jan. 29, 2020, now Pat. No. 10,978,928.

(30) Foreign Application Priority Data

Jul. 8, 2019 (JP) .............................. JP2019-127035

(51) Int. Cl.
*H02K 3/50* (2006.01)
*H02K 3/28* (2006.01)
(Continued)

(52) U.S. Cl.
CPC ................. *H02K 3/50* (2013.01); *H02K 3/28* (2013.01); *H02K 5/225* (2013.01);
(Continued)

(58) Field of Classification Search
CPC .. H02K 3/28; H02K 15/0062; H02K 15/0068; H02K 5/225; H02K 3/50;
(Continued)

(56) References Cited

U.S. PATENT DOCUMENTS 6,462,453 B1 10/2002 Asao et al.
10,978,928 B2 * 4/2021 Mashiko ................ H02K 5/225
(Continued)

FOREIGN PATENT DOCUMENTS

JP 2001-238419 A 8/2001
JP 2016-082675 A 5/2016

*Primary Examiner* — Alexander A Singh
(74) *Attorney, Agent, or Firm* — Thomas W. Cole; Calderon Safran & Cole P.C.

(57) ABSTRACT

An electrical distribution member includes a plurality of electrical conducting wires made of a solid wire. The electrical conducting wires each include an electrical conducting body, and a coating layer provided over a surface of that electrical conducting body, while removed therefrom over a respective predetermined length including a joining portion. The electrical conducting wires include at least one first electrical conducting wire having a joining portion extending in an axial direction of a stator core, and at least one second electrical conducting wire having a joining portion bent in relation to a radial direction of the stator core in such a manner as to follow a circumferential direction of the stator core. The predetermined length of the second electrical conducting wire with the coating layer removed therefrom is longer than the predetermined length of the first electrical conducting wire with the coating layer removed therefrom.

12 Claims, 8 Drawing Sheets

(51) Int. Cl.
*H02K 5/22* (2006.01)
*H02K 15/00* (2006.01)

(52) U.S. Cl.
CPC ..... *H02K 15/0062* (2013.01); *H02K 15/0068* (2013.01); *H02K 2203/06* (2013.01)

(58) Field of Classification Search
CPC ...... H02K 2203/06; H02K 3/52; H02K 3/522; H02K 3/04; H02K 5/22
USPC .......................................................... 310/71
See application file for complete search history.

(56) References Cited

U.S. PATENT DOCUMENTS

| | | | |
|---|---|---|---|
| 2014/0306561 A1* | 10/2014 | Egami | H02K 3/12 310/71 |
| 2014/0306562 A1* | 10/2014 | Egami | H02K 5/225 310/71 |
| 2016/0336829 A1* | 11/2016 | Haruno | H02K 5/225 |
| 2017/0110810 A1* | 4/2017 | Kurono | H02K 3/50 |
| 2017/0110929 A1 | 4/2017 | Egami | |

\* cited by examiner

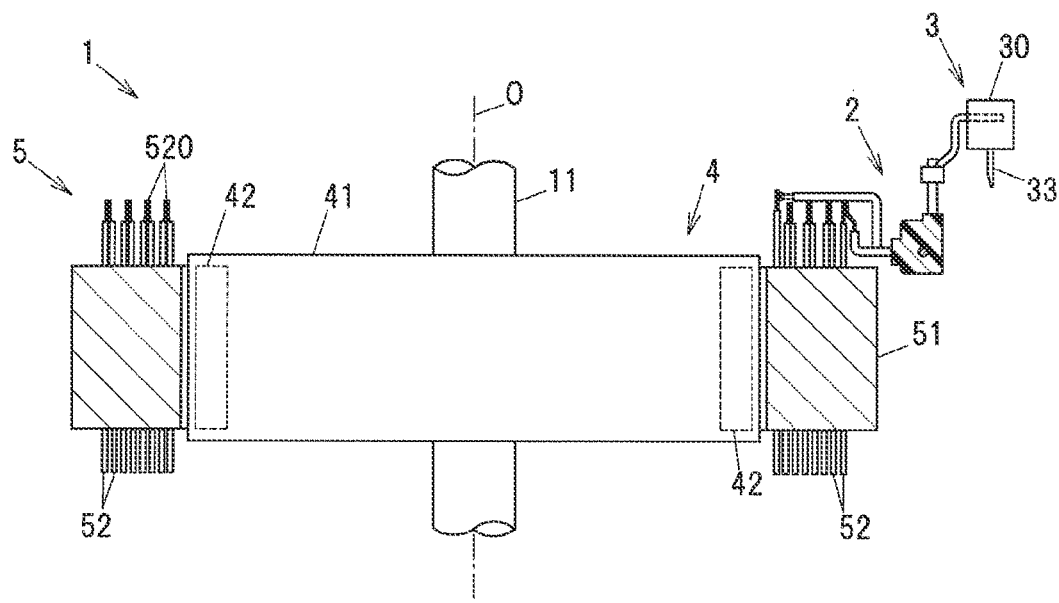
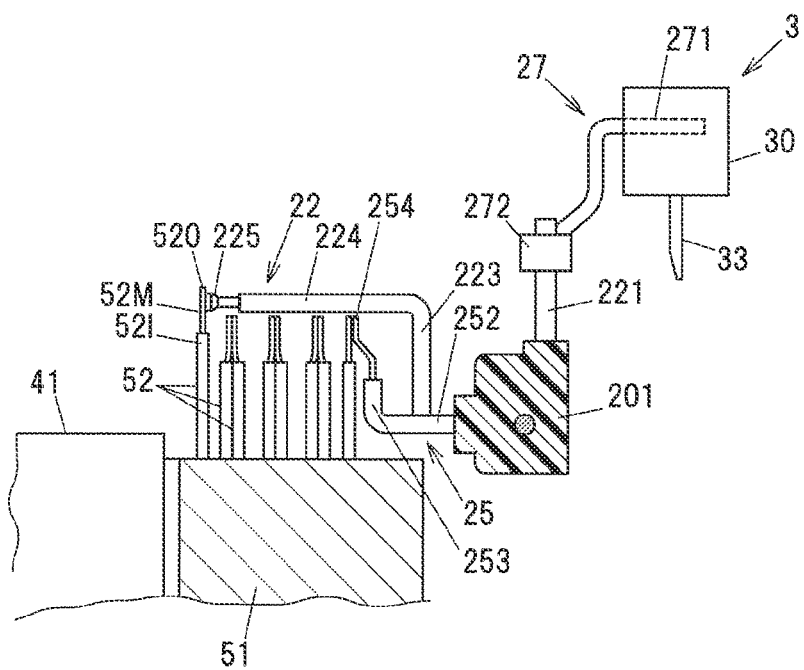

ELECTRICAL DISTRIBUTION MEMBER

CROSS-REFERENCE TO RELATED APPLICATIONS

The present application is a continuation of the U.S. patent application Ser. No. 16/766,062 filed on Jan. 29, 2020 which is based on Japanese Patent Application No. 2019-127035 filed on Jul. 8, 2019, the entire contents of which are incorporated herein by reference.

BACKGROUND OF THE INVENTION

1. Field of the Invention

The present invention relates to an electrical distribution member that connects a plurality of coil ends, which are protruding in an axial direction from a stator core of a rotating electrical machine, and electrodes, respectively, of a terminal block together.

2. Description of the Related Art

Conventionally, as disclosed in e.g. JP2001-238419A, there is a rotating electrical machine that functions as an electric motor or an electric generator, with a plurality of coil pieces being attached to slots provided in a stator core, with coil ends, which are end portions of the plurality of coil pieces, being welded together. The plurality of coil pieces are each being provided with an electrical insulating coating over their respective electrical conductors having a flat cross section, excluding their respective coil ends. The plurality of coil pieces constitute three phase stator windings by the coil ends being welded together.

Further, JP2016-82675A2 discloses a wire connection structure for an electric motor provided with a terminal block unit for feeding each phase electric current to each of three phase stator windings respectively. The terminal block unit is being provided with a first, a second, and a third lead wire, which connect a first, a second, and a third terminal, and terminated ends of a U phase winding, a V phase winding, and a W phase winding respectively together, and a terminal block, which is fixed to a stator core. The first, the second, and the third lead wires have their respective main body sections, which are extending at right angles to a rotation axis of a rotor, and their respective bent tip portions to be welded to the terminated ends of the U, the V, and the W phase windings respectively, with the bent tip portions of the first, the second, and the third lead wires being bent at a right angle to the main body sections of the first, the second, and the third lead wires respectively. The terminated ends of the U, the V, and the W phase windings are protruding from the stator core and in an axial direction parallel to the rotation axis of the rotor. By configuring the windings and the lead wires in this manner, the work efficiency in welding the terminated ends of the windings and the bent tip portions of the lead wires together is being enhanced.

[Patent Document 1] JP2001-238419A
[Patent Document 2] JP2016-82675A

SUMMARY OF THE INVENTION

When the wire connection structure disclosed in JP2016-82675A is applied to the rotating electrical machine disclosed in JP2001-238419A, it is conceivable that the coil ends of JP2001-238419A to be connected to the first, the second, and the third lead wires of JP2016-82675A are extended out in the aforementioned axial direction parallel to the rotation axis of the rotor in such a manner as to follow the bent tip portions of the first, the second, and the third lead wires. However, this leads to an increase in the axial length of the rotating electrical machine including the coil ends. Further, when the shapes of the lead wires are altered in order to shorten the axial length of the rotating electrical machine, there is a need to be careful with the melting of the coating layer of the lead wires caused by heat during welding the lead wires and the coil ends together, or be careful with the spatial distances between the conductor sections of the lead wires and the coil ends.

The present invention has been made in view of the foregoing, and an object of the present invention is to provide an electrical distribution member, which is configured to suppress an increase in an axial length of a rotating electrical machine, but be able to suppress the occurrence of a coating layer melting resulting from heating during welding to an end portion of a coil piece constituting a winding.

For the purpose of solving the above problems, the present invention provides an electrical distribution member, comprising: a plurality of electrical conducting wires each being made of a solid wire, to connect a plurality of coil ends, which are protruding in an axial direction from a stator core of a rotating electrical machine, and electrodes, respectively, of a terminal block together, the plurality of electrical conducting wires each including an electrical conducting body, which is made of an electrically conductive metal, and a coating layer, which is being provided over a surface of that electrical conducting body, while being removed therefrom over a range of a predetermined length including a joining portion to be welded to the coil end, wherein the plurality of electrical conducting wires include at least one first electrical conducting wire, which has the joining portion extending in the axial direction of the stator core, and at least one second electrical conducting wire, which has the joining portion being bent in relation to a radial direction of the stator core in such a manner as to follow a circumferential direction of the stator core, wherein the predetermined length of the at least one second electrical conducting wire with the coating layer being removed therefrom is longer than the predetermined length of the at least one first electrical conducting wire with the coating layer being removed therefrom.

POINTS OF THE INVENTION

The electrical distribution member according to the present invention makes it possible to suppress an increase in an axial length of the rotating electrical machine, but be able to suppress the occurrence of a coating layer melting resulting from heating during welding to an end portion of a coil piece constituting a winding.

BRIEF DESCRIPTION OF THE DRAWINGS

FIG. 1A is an overall view showing a configuration example of a rotating electrical machine provided with an electrical distribution member according to an embodiment of the present invention;

FIG. 1B is a partially enlarged view of FIG. 1A;

DETAILED DESCRIPTION OF THE PREFERRED EMBODIMENTS

Embodiment

Figure 2:
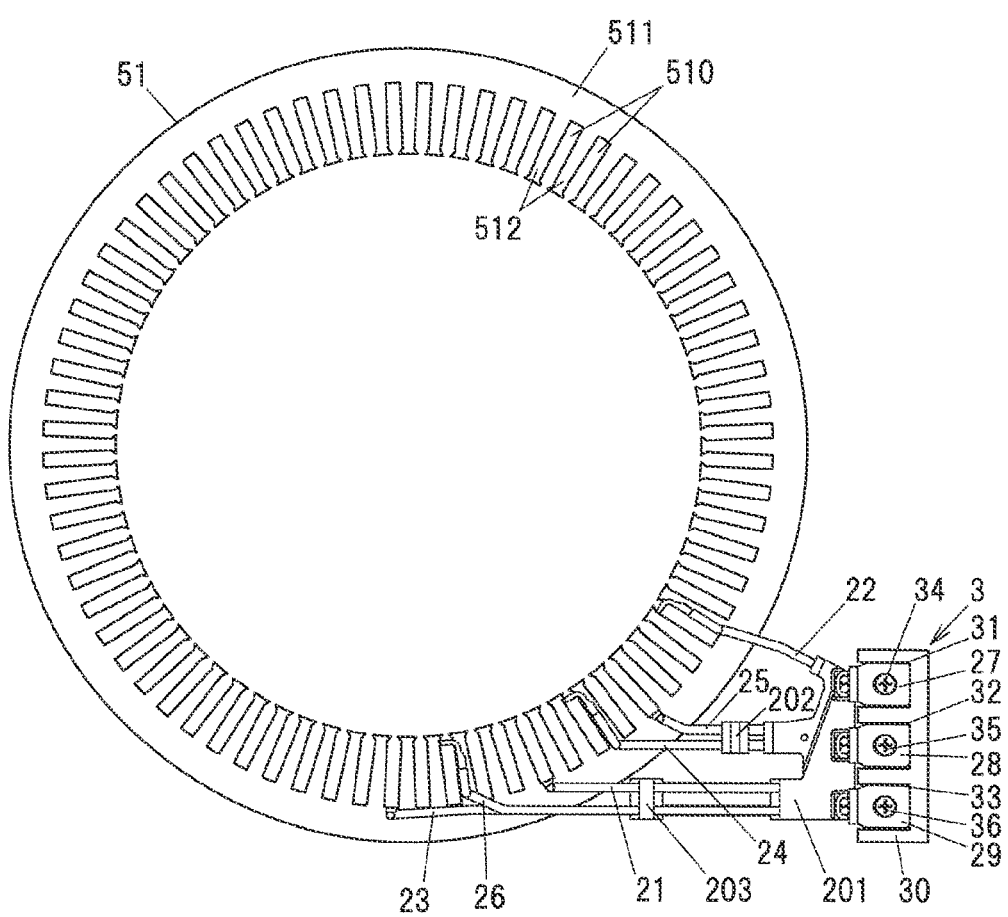
FIG. 2 is a configuration view showing the electrical distribution member, a terminal block, and a stator core when viewed from an axial direction.

FIG. 1A is an overall view showing a configuration example of a rotating electrical machine 1 provided with an electrical distribution member according to an embodiment of the present invention, and FIG. 1B is a partially enlarged view of FIG. 1A.

The rotating electrical machine 1 is being configured to include an electrical distribution member 2, a terminal block 3, a rotor 4 with a shaft 11 inserted in and passed through a central portion thereof, and a stator 5, which is being arranged in such a manner as to surround the rotor 4. The rotor 4 has a plurality of magnets 42 embedded in a rotor core 41, which is made of a soft magnetic metal, so that the rotor 4 rotates together with the shaft 11. The stator 5 is being configured to include a stator core 51, which is made of a soft magnetic metal, and a plurality of coil pieces 52.

The rotating electrical machine 1 is designed to be mounted on a vehicle, which is designed to be driven by an electric power, such as an electric vehicle or a so-called hybrid vehicle or the like. In the following description, a case where the rotating electrical machine 1 is used as an electric motor will be described, but the rotating electrical machine 1 can also be used as an electric generator. Further, in the following description, a direction parallel to a rotation axis O of the shaft 11 will be referred to as the axial direction, while a direction perpendicular to the rotation axis O will be referred to as the radial direction, and a direction perpendicular to the axial direction and the radial direction will be referred to as the circumferential direction.

Figure 3:
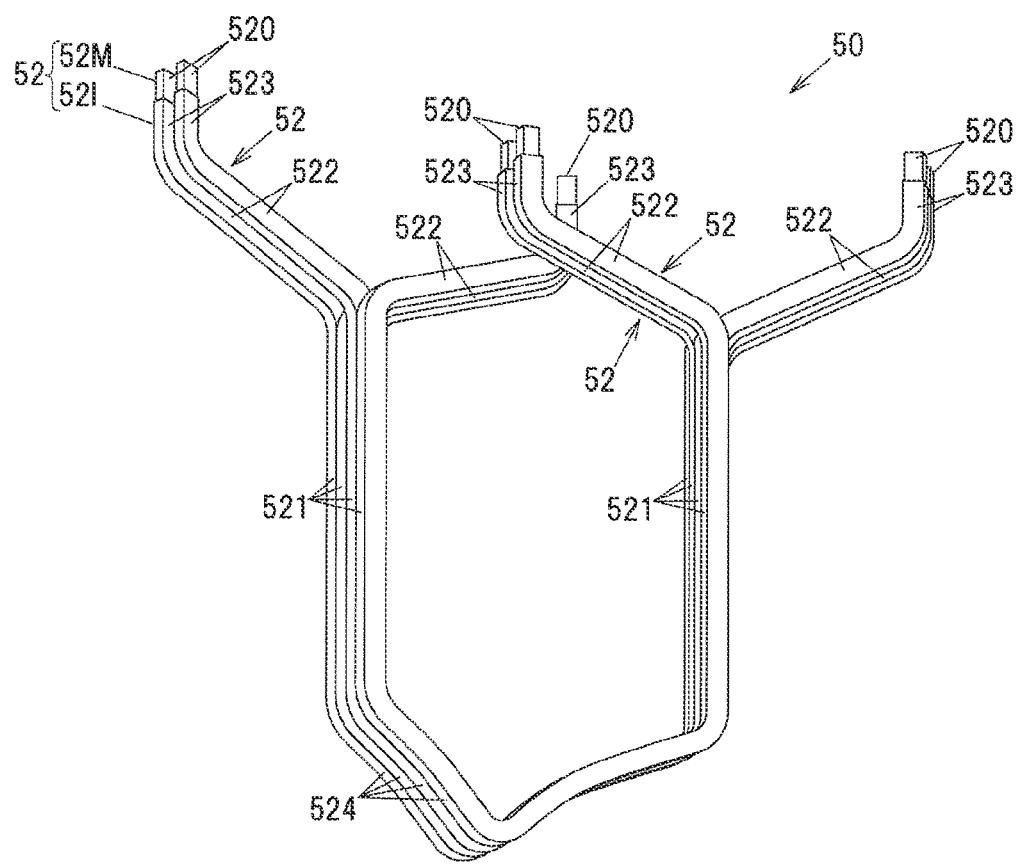
FIG. 3 is a perspective view showing a coil unit with four coil pieces being combined together therein.

FIG. 2 is a configuration view showing the electrical distribution member 2, the terminal block 3, and the stator core 51 when viewed from the axial direction. FIG. 3 is a perspective view showing a coil unit 50 with four of the coil pieces 52 being combined together therein. Note that, in the following description, for convenience of description, of two sides in the axial direction of the stator core 51, one side to which the electrical distribution member 2 and the terminal block 3 are being arranged will be referred to as the upper side, while the other side (the opposite side thereto) will be referred to as the lower side. It should be noted, however, that the upper side and the lower side are not to be construed as specifying the upper side and the lower side in the vertical direction with the rotating electrical machine 1 being mounted on the vehicle.

The terminal block 3 is being configured to include a base block 30, which is made of a resin, and a first, a second, and a third electrode 31, 32, and 33. The base block 30 of the terminal block 3 is fixed to a case member (not shown) configured to receive the stator 5, while the first, the second, and the third electrodes 31, 32, and 33 of the terminal block 3 are supplied with three phase AC electric currents respectively from a controller.

The stator core 51 of the stator 5 is being configured to integrally include a circular cylindrical shape back yoke 511, and a multiplicity of teeth 512, which are protruding inward in the radial directions from the back yoke 511. In the present embodiment, the stator core 51 is being provided with the 72 teeth 512 at equally spaced intervals in the circumferential direction thereof, and is being formed with slots 510 between adjacent ones, respectively, of the teeth 512 in the circumferential direction thereof.

The constituent coil pieces 52 of the stator 5 are each being configured to include respective one pair of linear shape main body sections 521, which are received in the slots 510 of the stator core 51, respective one pair of inclined portions 522, which are arranged to the upper side of the stator core 51 in such a manner as to protrude from the slots 510 of the stator core 51, respective one pair of linear shape portions 523, which are extending further upward in the axial direction from upper end portions of the respective one pair of inclined portions 522, and a joining portion 524, which is joining the respective one pair of linear shape main body sections 521 together in the lower side of the stator core 51. The inclined portions 522 are each inclined in such a manner as to form an obtuse angle to the linear shape main body sections 521 respectively.

Further, the constituent coil pieces 52 of the stator 5 are each being configured to include a respective electrically conductive metal 52M, which has a good electrical conductivity, such as a copper or an aluminum or the like, and a respective electrically insulating coating layer 521, which is being provided over a surface of that respective electrically conductive metal 52M. In the present embodiment, the electrically conductive metals 52M of the coil pieces 52 are each being configured as a rectangular single wire which is rectangular in cross section, and the coating layers 521 of the coil pieces 52 are each made of an enamel coating. For respective coil ends 520 of the coil pieces 52, which are upper end portions of their respective linear shape portions 523, their respective electrically conductive metals 52M are being exposed by removing their coating layers 521.

Further, in the present embodiment, the 288 coil pieces 52 are attached to the stator core 51, and the 8 linear shape main body sections 521 are received in each of the slots 510. The coil ends 520 of the 288 coil pieces 52 are welded together to constitute two sets of three phase (a U phase, a V phase, and a W phase) stator windings. Further, of the two sets of three phase stator windings, a first set of three phase stator windings and a second set of three phase stator windings are out of phase in electrical angle by a predetermined angle. The first set of three phase stator windings is being formed around an outer peripheral side of the stator core 51 relative to the second set of three phase stator windings. Note that the welded portions of the coil pieces 52 with their coil ends 520 being welded together therein may be coated with a resin.

Figure 4:
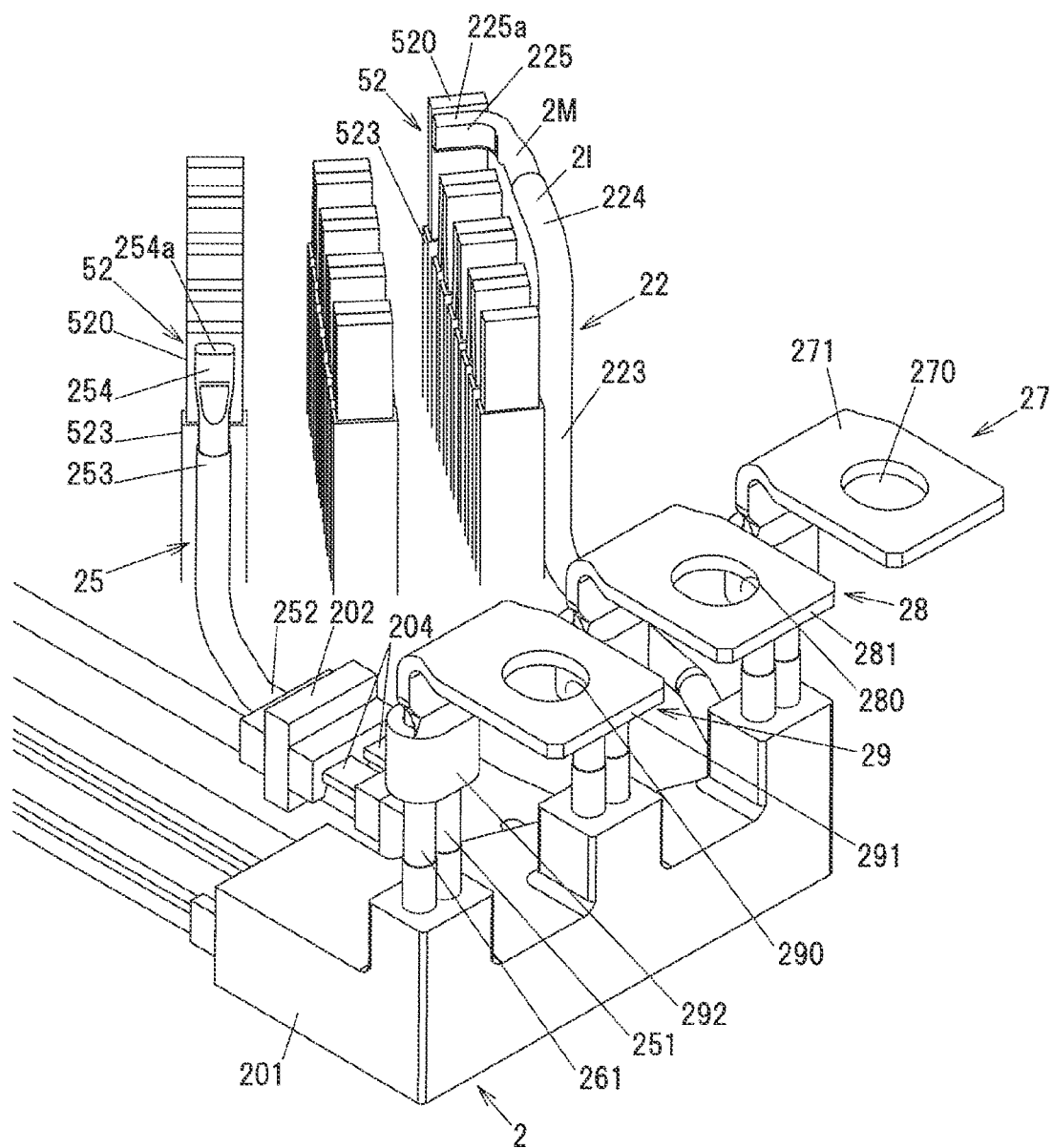
FIG. 4 is a perspective view showing a part of the electrical distribution member together with linear shape portions of some coil pieces of a plurality of the coil pieces attached to the stator core.
Figure 5A:
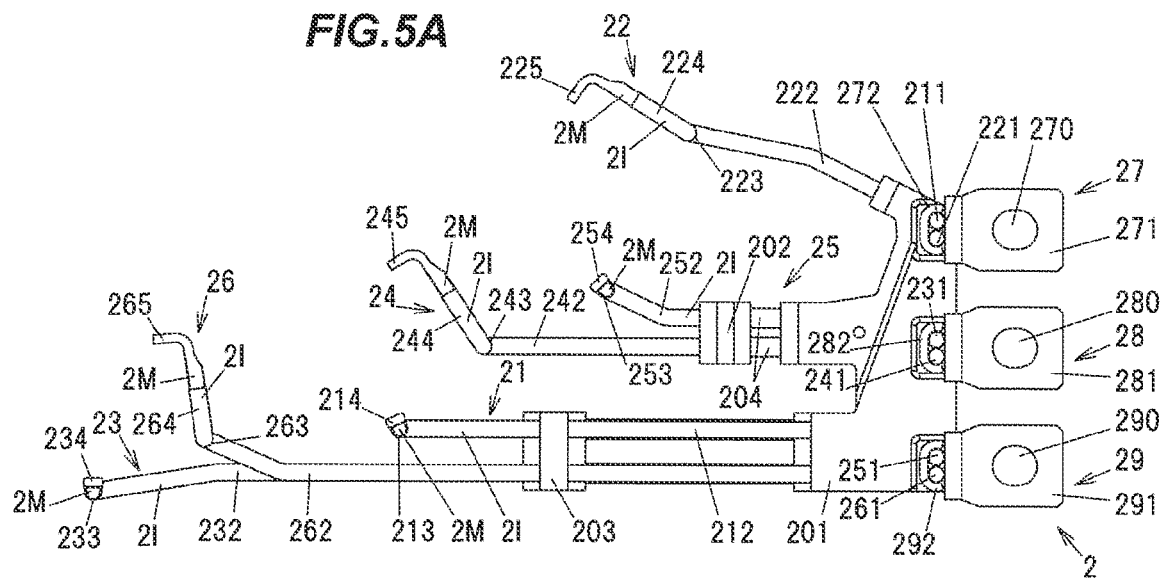
FIG. 5A is an axial direction view showing the electrical distribution member.
Figure 5B:
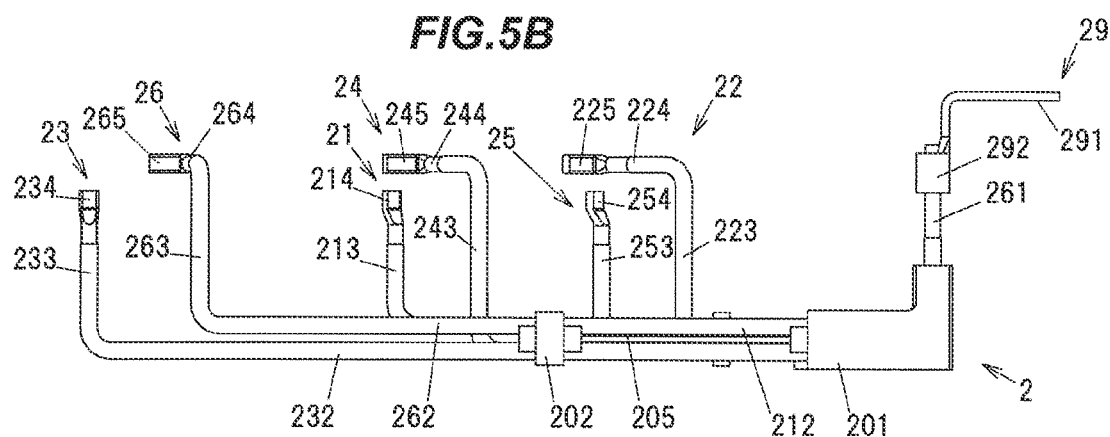
FIG. 5B is a circumferential direction view showing the same electrical distribution member.
Figure 5C:
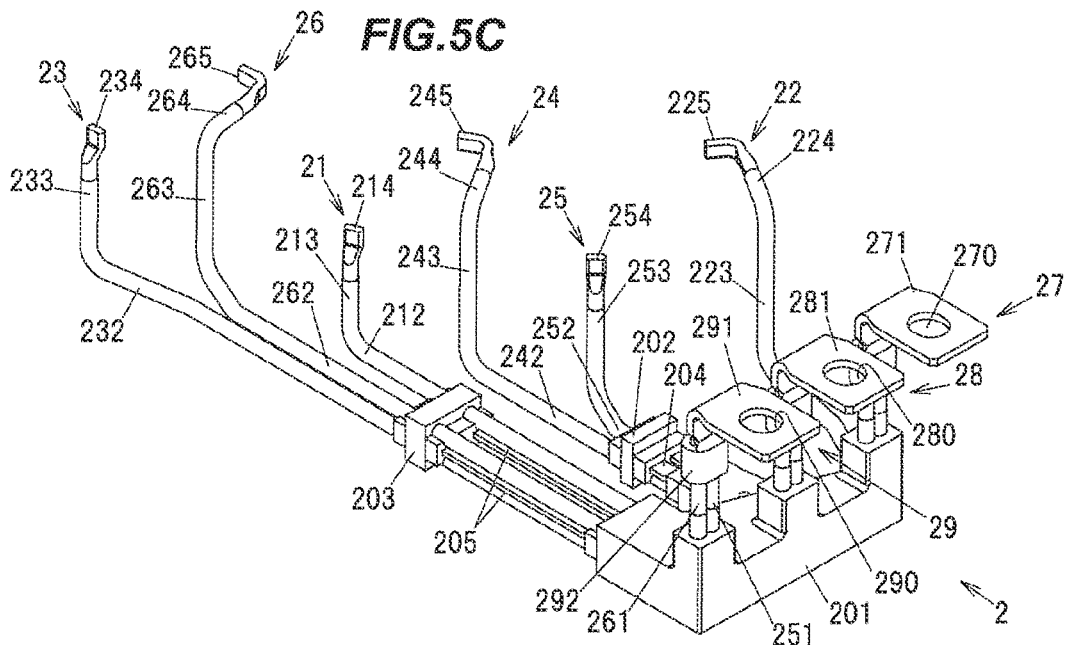
FIG. 5C is a perspective view showing the same electrical distribution member.

FIG. 4 is a perspective view showing a part of the electrical distribution member 2 together with the linear shape portions 523 of some coil pieces 52 of the plurality of coil pieces 52 attached to the stator core 51. FIG. 5A is an axial direction view showing the electrical distribution member 2. FIG. 5B is a circumferential direction view showing the electrical distribution member 2. FIG. 5C is a perspective view showing the electrical distribution member 2.

The electrical distribution member 2 is being configured to include six electrical conducting wires and three terminals, and connect the first, the second, and the third electrodes 31, 32, and 33 of the terminal block 3, and the coil ends 520 of the coil pieces 52 of the U, the V, and the W phases respectively together. The six electrical conducting wires are made of a first and a second U phase lead wire 21 and 22, a first and a second V phase lead wire 23 and 24, and a first and a second W phase lead wire 25 and 26. The three terminals are made of a U phase terminal 27, a V phase terminal 28, and a W phase terminal 29. The U phase terminal 27 is being configured to include a plate shape portion 271, which is connected to the first electrode 31 of the terminal block 3, and a staking portion 272, in which both the first and the second U phase lead wires 21 and 22 are being staked. The plate shape portion 271 is being formed with a bolt insertion passage 270 therein, so that the plate shape portion 271 is connected to the first electrode 31 by a bolt 34 (see FIG. 2) being inserted in and passed through the bolt insertion passage 270.

Similarly, the V phase terminal 28 is being configured to include a plate shape portion 281, which is connected to the second electrode 32 of the terminal block 3, and a staking portion 282, in which both the first and the second V phase lead wires 23 and 24 are being staked. The plate shape portion 281 is being formed with a bolt insertion passage 280 therein, so that the plate shape portion 281 is connected to the second electrode 32 by a bolt 35 (see FIG. 2) being inserted in and passed through the bolt insertion passage 280. Further, similarly, the W phase terminal 29 is being configured to include a plate shape portion 291, which is connected to the third electrode 33 of the terminal block 3, and a staking portion 292, in which both the first and the second W phase lead wires 25 and 26 are being staked. The plate shape portion 291 is being formed with a bolt insertion passage 290 therein, so that the plate shape portion 291 is connected to the third electrode 33 by a bolt 36 (see FIG. 2) being inserted in and passed through the bolt insertion passage 290.

The first U phase lead wire 21, the first V phase lead wire 23, and the first W phase lead wire 25 are being configured to electrically connect together the U, the V, and the W phase terminals 27, 28, and 29, and the coil ends 520 of the coil pieces 52 corresponding to the end portions of the first set of three phase stator windings, i.e., the U, the V, and the W phase stator windings, respectively. The second U phase lead wire 22, the second V phase lead wire 24, and the second W phase lead wire 26 are being configured to electrically connect together the U, the V, and the W phase terminals 27, 28, and 29, and the coil ends 520 of the coil pieces 52 corresponding to the end portions of the second set of three phase stator windings, i.e., the U, the V, and the W phase stator windings, respectively.

The first U phase lead wire 21, the first V phase lead wire 23, and the first W phase lead wire 25 correspond to the "first electrical conducting wires" of the inventions according to the claims. The second U phase lead wire 22, the second V phase lead wire 24, and the second W phase lead wire 26 correspond to the "second electrical conducting wires" of the inventions according to the claims.

The first and the second U phase lead wires 21 and 22, the first and the second V phase lead wires 23 and 24, and the first and the second W phase lead wires 25 and 26 are each being configured to include an electrical conducting body 2M, which is made of an electrically conductive metal, and a respective electrically insulative coating layer 21, which is being provided over a surface of that electrical conducting body 2M. As the electrically conductive metal for the electrical conducting bodies 2M of the lead wires 21 to 26, for example, a copper or a copper alloy can suitably be used. As the coating layers 21 of the lead wires 21 to 26, an enamel coating film can suitably be used. The electrical conducting bodies 2M of the lead wires 21 to 26 are each being configured as a single wire (a single metal conductor that is not a stranded wire), and in the present embodiment, are each being configured by press molding a round single wire, which is in a circular shape in cross section, into a predetermined shape. It should be noted, however, that the electrical conducting bodies 2M of the lead wires 21 to 26 may each be formed by using a rectangular single wire, which is in a rectangular shape in cross section.

Further, the first and the second U phase lead wires 21 and 22, the first and the second V phase lead wires 23 and 24, and the first and the second W phase lead wires 25 and 26 are being held in a first holding portion 201 of the electrical distribution member 2. Further, the second V phase lead wire 24 and the first W phase lead wire 25 are being held in a second holding portion 202 of the electrical distribution member 2. Furthermore, the first U phase lead wire 21, the first V phase lead wire 23, and the second W phase lead wire 26 are being held in a third holding portion 203 of the electrical distribution member 2. The first holding portion 201 and the second holding portion 202 are being coupled together with a coupling portion 204, while the first holding portion 201 and the third holding portion 203 are being coupled together with a coupling portion 205. The first, the second, and the third holding portions 201, 202, and 203 and the coupling portions 204 and 205 are made of a resin integrally molded by injection molding.

Note that at least one of the first, the second, and the third holding portions 201, 202, and 203 may be provided with a fixing portion (such as a flange section having a bolt insertion passage for a bolt to be inserted in and passed through, or the like) to fix the electrical distribution member 2 to another part. By fixing the electrical distribution member 2 to another part, it is possible to suppress the occurrence of a vibration, which is applied to the distribution member 2, a welded portion with the distribution member 2 and the coil ends 520 welded together therein, and a connected portion with the distribution member 2 and the terminal block 3 connected together therein. Further, at least one of the first, the second, and the third holding portions 201, 202, and 203 may be provided with a handling portion for robot transfer.

The first U phase lead wire 21, the first V phase lead wire 23, and the first W phase lead wire 25 are each being configured to include a respective extending out portion 211, 231, and 251, which are extended out in the axial direction from the first holding portion 201 and connected to the U, the V, and the W phase terminals 27, 28, and 29 respectively, a respective elongated portion 212, 232, and 252, which are extended out from the first holding part 201 and elongated in a respective direction perpendicular to the axial direction, a respective axial direction extension portion 213, 233, and 253, which are extending upward in the axial direction from a respective end portion of the respective elongated portion 212, 232, and 252, and a joining portion 214, 234, and 254, which are welded to the coil ends 520 respectively of the coil pieces 52.

The joining portions 214, 234, and 254 of the first U phase lead wire 21, the first V phase lead wire 23, and the first W phase lead wire 25 are extending further upward in the axial direction from upper end portions of the axial direction extension portions 213, 233, and 253 respectively, and are welded to the coil ends 520 of the coil pieces 52 corresponding to the end portions of the first set of three phase stator windings, i.e., the U phase, the V phase, and the W phase stator windings, respectively, which are being protruded in the axial direction from the stator core 51. Further, the respective electrical conducting bodies 2M of the first U phase lead wire 21, the first V phase lead wire 23, and the first W phase lead wire 25 are being exposed by removing their coating layer 21 over a range of a predetermined length including their joining portion 214, 234, and 254.

The second U phase lead wire 22, the second V phase lead wire 24, and the second W phase lead wire 26 are each being configured to include a respective extending out portion 221, 241, and 261, which are extended out in the axial direction from the first holding portion 201 and connected to the U, the V, and the W phase terminals 27, 28, and 29 respectively, a respective elongated portion 222, 242, and 262, which are extended out from the first holding part 201 and elongated in a respective direction perpendicular to the axial direction, a respective axial direction extension portion 223, 243, and 263, which are extending upward in the axial direction from a respective end portion of the respective elongated portion 222, 242, and 262, a respective radial direction extension portion 224, 244, and 264, which are extending further in a radial direction from a respective end portion of the respective axial direction extension portion 223, 243, and 263 and to an inner side of the stator core 51, and a joining portion 225, 245, and 265, which are bent in relation to the radial direction in such a manner as to follow the circumferential direction of the stator core 51 and welded to the coil ends 520 respectively of the coil pieces 52.

The joining portions 225, 245, and 265 of the second U phase lead wire 22, the second V phase lead wire 24, and the second W phase lead wire 26 are extending in the circumferential direction from the inner end portions in the radial directions of the radial direction extension portions 224, 244, and 264 respectively, and are welded to the coil ends 520 of the coil pieces 52 corresponding to the end portions of the second set of three phase stator windings, i.e., the U phase, the V phase, and the W phase stator windings, respectively, which are being protruded in the axial direction from the stator core 51. In addition, the respective electrical conducting bodies 2M of the second U phase lead wire 22, the second V phase lead wire 24, and the second W phase lead wire 26 are being exposed by removing their coating layer 21 over a range of a predetermined length including their joining portion 225, 245, and 265. The joining portions 225, 245, and 265 of the second U phase lead wire 22, the second V phase lead wire 24, and the second W phase lead wire 26 are bent in the circumferential direction of the stator core 51 at the inner end portions in the radial directions of the radial direction extension portions 224, 244, and 264, and are extending along the circumferential direction of the stator core 51.

The joining portions 225, 245, and 265 of the second U phase lead wire 22, the second V phase lead wire 24, and the second W phase lead wire 26 are joined to the coil ends 520 of the coil pieces 52 in an inner side in the radial directions of the stator core 51 relative to the joining portions 214, 234 and 254 of the first U phase lead wire 21, the first V phase lead wire 23 and the first W phase lead wire 25, respectively. The opposite surfaces of the joining portions 214, 225, 234, 245, 254, and 265 of the lead wires 21, 22, 23, 24, 25, and 26 to the coil ends 520 of the coil pieces 52 are made planar by press working.

In the present embodiment, the welding of the joining portions 214, 225, 234, 245, 254, and 265 of the lead wires 21, 22, 23, 24, 25, and 26 and the coil ends 520 of the coil pieces 52 is performed by TIG (Tungsten Inert Gas) welding, which is a type of welding method by arc discharge using an inert gas. In the TIG welding, the stator 5 is fixed to a jig in such a manner that the coil ends 520 of the coil pieces 52 are protruded upward in the vertical direction from the stator core 51, and an electrode of a welding torch is opposed to the coil ends 520 of the coil pieces 52 in the axial direction.

As shown in FIG. 4 taking the second U phase lead wire 22 and the first W phase lead wire 25 as an example, in the TIG welding, the coil ends 520 of the coil pieces 52 are being protruded in the axial direction longer than the joining portions 225 and 254 of the second U phase lead wire 22 and the first W phase lead wire 25, and the portions of the coil ends 520, which are protruding in the axial direction relative to the joining portions 225 and 254 of the second U phase lead wire 22 and the first W phase lead wire 25 respectively, are melted by heat resulting from arc discharge and welded to the joining portions 225 and 254 of the second U phase lead wire 22 and the first W phase lead wire 25 respectively. The molten metal resulting from the melting of the tip portions of the coil ends 520 flows down and comes into contact with an upper side surface 225a of the joining portion 225 of the second U phase lead wire 22 or an upper surface 254a of the joining portion 254 of the first W phase lead wire 25. It should be noted, however, that the present invention is not limited to this, but that the tip surfaces of the coil ends 520, and the upper side surface 225a of the joining portion 225 of the second U phase lead wire 22 and the upper surface 254a of the joining portion 254 of the first W phase lead wire 25 may be the same in position in the axial direction. That is, the coil ends 520 may not be protruding in the axial direction relative to the joining portions 225 and 254 of the second U phase lead wire 22 and the first W phase lead wire 25.

Figure 6A:
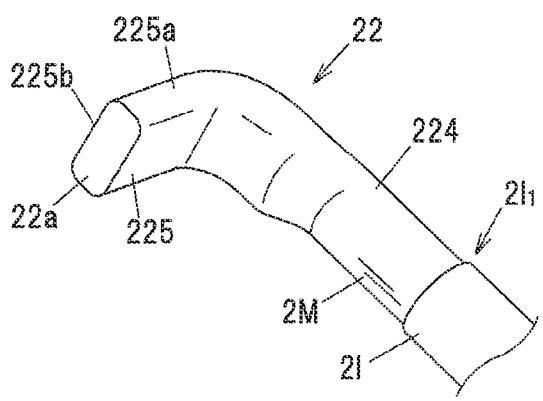
FIG. 6A is a perspective view showing a joining portion and one part of a radial direction extension portion of a second U phase lead wire.
Figure 6B:
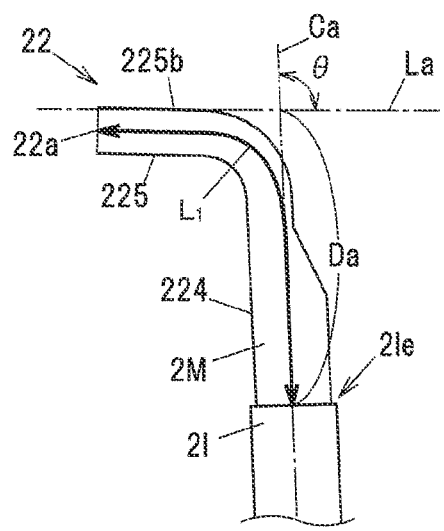
FIG. 6B is an axial direction view showing the joining portion and the one part of the radial direction extension portion of the second U phase lead.
Figure 7A:
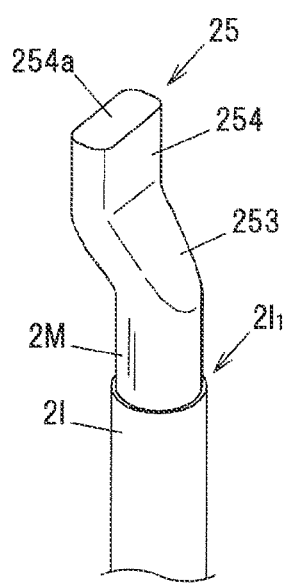
FIG. 7A is a perspective view showing a joining portion and one part of an axial direction extension portion of a first W phase lead wire.
Figure 7B:
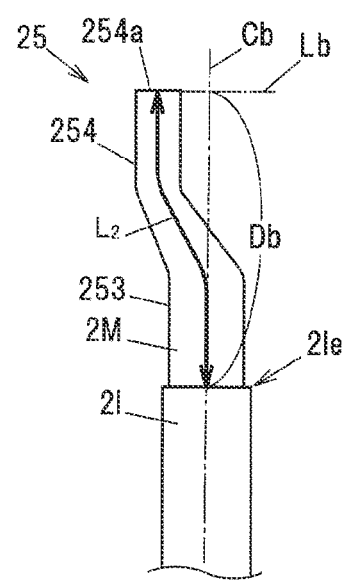
FIG. 7B is a circumferential direction view showing the joining portion and the one part of the axial extension portion of the first W phase lead.
Figure 8:
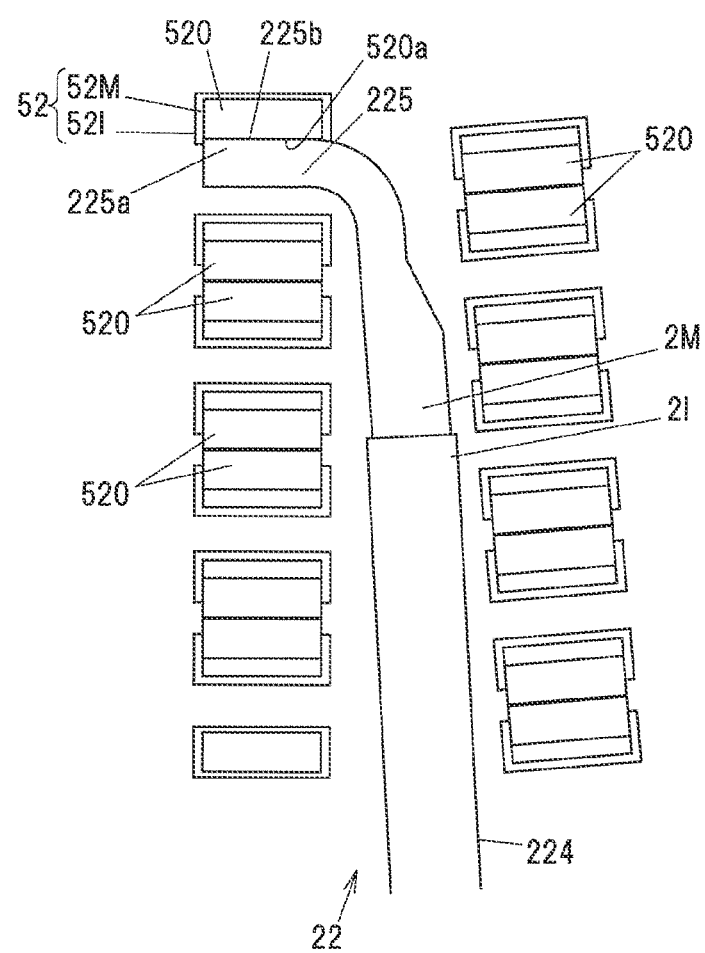
FIG. 8 is an axial direction view showing the joining portion and the radial direction extension portion of the second U phase lead wire together with coil ends of a plurality of the coil pieces.

FIGS. 6A and 6B are a perspective view and an axial direction view, respectively, showing the joining portion 225 and a part of the radial direction extension portion 224 of the second U phase lead wire 22. FIGS. 7A and 7B are a perspective view and a circumferential direction view, respectively, showing the joining portion 254 and a part of the axial direction extension portion 253 of the first W phase lead wire 25. FIG. 8 is an axial direction view showing the joining portion 225 and the radial direction extension portion 224 of the second U phase lead wire 22 together with the coil ends 520 of a plurality of the coil pieces 52.

Note that the joining portions 245 and 265 and the respective radial direction extension portions 244 and 264 of the second V phase lead wire 24 and the second W phase lead wire 26 are also being configured in the same manner as the joining portion 225 and the radial direction extension portion 224, respectively, of the second U phase lead wire 22. Further, the joining portions 214 and 234 and the respective axial direction extension portions 213 and 233 of the first U phase lead wire 21 and the first V phase lead wire 23 are also being configured in the same manner as the joining portion 254 and the axial direction extension portion 253, respectively, of the first W phase lead wire 25.

For the second U phase lead wire 22, its coating layer 21 is being removed not only from its joining portion 225 but also from a part of its radial direction extension portion 224. Further, similarly, for the first W phase lead wire 25, its coating layer 21 is being removed not only from its joining portion 254 but also from a part of its axial direction extension portion 253. This suppresses the melting of the coating layers 21 of the second U phase lead wire 22 and the first W phase lead wire 25 from being caused by heat resulting from welding of their joining portions 225 and 254.

As shown in FIGS. 6B and 7B, L1 is defined as a length of the second U phase lead wire 22 from its tip surface 22a with its coating layer 21 being removed from the second U phase lead wire 22, while L2 is defined as a length of the first W phase lead wire 25 from its upper surface 254a with its coating layer 21 being removed from the first W phase lead wire 25. FIGS. 6B and 7B are the same in scaling, and the length L1 of the second U phase lead wire 22 from its tip surface 22a with its coating layer 21 being removed from the second U phase lead wire 22 is longer than the length L2 of the first W phase lead wire 25 from its upper surface 254a with its coating layer 21 being removed from the first W phase lead wire 25. Note that the length L1 for the second U phase lead wire 22 is the length along the respective extending directions of the joining portion 225 and the radial direction extension portion 224 of the second U phase lead wire 22, while the length L2 for the first W phase lead wire 25 is the length along the respective extending directions of the joining portion 254 and the axial direction extension portion 253 of the first W phase lead wire 25.

The respective longer lengths L1 and L2 of the second U phase lead wire 22 and the first W phase lead wire 25 are more effective in preventing the melting of their coating layers 21, but when the respective lengths L1 and L2 of the second U phase lead wire 22 and the first W phase lead wire 25 are increased, the spatial distances of the second U phase lead wire 22 and the first W phase lead wire 25 to the coil ends 520 of the other phase coil pieces 52 become short. For this reason, it is desirable to make the respective lengths L1 and L2 of the second U phase lead wire 22 and the first W phase lead wire 25 as short as possible while preventing the melting of their coating layers 21. In the present embodiment, the respective lengths L1 and L2 of the second U phase lead wire 22 and the first W phase lead wire 25 are being configured based on the above point of view. More specifically, the respective lengths L1 and L2 of the second U phase lead wire 22 and the first W phase lead wire 25 are being configured in such a manner that the distances from the respective parts of the second U phase lead wire 22 and the first W phase lead wire 25, which are brought into contact with the molten metals resulting from the melting of the coil ends 520 during TIG welding, to ends 21e of the coating layers 21 of the second U phase lead wire 22 and the first W phase lead wire 25 become substantially equal to each other. This makes it possible to weld the joining portions 225, 245, and 265 of the second U phase lead wire 22, the second V phase lead wire 24, and the second W phase lead wire 26, which are extending along the circumferential direction, and the joining portions 214, 234, and 254 of the first U phase lead wire 21, the first V phase lead wire 23, and the first W phase lead wire 25, which are extending along the axial direction, in the same welding conditions.

The respective parts of the second U phase lead wire 22 and the first W phase lead wire 25, which are brought into contact with the molten metals resulting from the melting of the coil ends 520 during TIG welding, are the side surface 225a of the joining portion 225 in the second U phase lead wire 22, and the upper surface 254a of the joining portion 254 in the first W phase lead wire 25. The side surface 225a of the joining portion 225 in the second U phase lead wire 22 is extending in the extending direction of the joining portion 225, whereas the upper surface 254a of the joining portion 254 in the first W phase lead wire 25 is not extending in the extending direction of the joining portion 254. This difference in the extending direction between the side surface 225a of the joining portion 225 in the second U phase lead wire 22 and the upper surface 254a of the joining portion 254 in the first W phase lead wire 25 is the difference between the respective lengths L1 and L2 of the second U phase lead wire 22 and the first W phase lead wire 25. That is, the difference between the lengths L1 and L2 is the dimension corresponding to the length of the side surface 225a along the extending direction of the joining portion 225 of the second U phase lead wire 22.

Further, as shown in FIG. 6B, when θ is defined as an angle formed by an extension line La, which is being drawn by extending an opposite surface 225b of the joining portion 225 of the second U phase lead wire 22 to the corresponding coil end 520 in the extending direction of the joining portion 225, and a central axis Ca of the radial direction extension portion 224, the angle θ is an obtuse angle. In other words, the angle formed by the opposite surface 225b of the second U phase lead wire 22 to the corresponding coil end 520 and the radial direction extension portion 224 is an obtuse angle, and so the joining portion 225 is bent at an angle of less than 90 degrees to the radial direction extension portion 224. Note that the extension line La and the central axis Ca are straight lines perpendicular to the axial direction.

More specifically, the angle θ is 92 to 94 degrees (not smaller than 92 degrees and not greater than 94 degrees), and in the present embodiment, the angle θ is 93 degrees. Note that, in the TIG welding, the opposite surface 225b of the joining portion 225 of the second U phase lead wire 22 is brought into surface contact with a side surface 520a (see FIG. 8) of the corresponding coil end 520.

As a result, in an axial direction view of the stator 5 shown in FIG. 8, the radial direction extension portion 224 of the second U phase lead wire 22 is arranged between the two sets of the pluralities of coil ends 520, which are being arranged in the circumferential direction of the stator 5, and the spatial distances between the electrical conducting body 2M exposed from the coating layer 21 of the second U phase lead wire 22 and the coil ends 520 are ensured. As a result, even if a cracking (crack formation) due to a vibration or the like occurs in a resin coating provided over the welded portions of the coil pieces 52 with their coil ends 520 being welded together therein, the electrical insulation properties can be ensured.

As shown in FIGS. 6B and 7B, when Da is defined as a distance along the central axis Ca of the radial direction extension portion 224 between the extension line La of the opposite surface 225b of the joining portion 225 in the second U phase lead wire 22 and the end portion 21e of the coating layer 21 of the second U phase lead wire 22, and when db is defined as a distance along the central axis Cb of the axial direction extension portion 253 between the extension line Lb of the upper surface 254a of the joining portion 254 in the first W phase lead wire 25 and the end portion 2Ie of the coating layer 21 of the first W phase lead wire 25, it is desirable that the ratio of the distance Da to the distance db, Da/db, is 0.90 to 1.10 (not smaller than 0.90 and not greater than 1.10). The more desirable range of the ratio Da/db is 0.95 to 1.05 (not smaller than 0.95 and not greater than 1.05).

Actions and Advantageous Effects of the Embodiment

According to the embodiment of the present invention described above, since the joining portions 225, 245, and 265 of the second U phase lead wire 22, the second V phase lead wire 24, and the second W phase lead wire 26, which are joined to the coil ends 520 in the inner side in the radial directions of the stator core 51 relative to the joining portions 214, 234 and 254 of the first U phase lead wire 21, the first V phase lead wire 23 and the first W phase lead wire 25 respectively, are bent in relation to the radial direction in such a manner as to follow the circumferential direction of the stator core 51, it is possible to suppress an increase in the axial length of the rotating electrical machine 1. Further, since in the second U phase lead wire 22, the second V phase lead wire 24, and the second W phase lead wire 26, the lengths of their respective portions with their coating layers 2I being removed therefrom are longer than in the first U phase lead wire 21, the first V phase lead wire 23, and the first W phase lead wire 25, it is possible to suppress the melting of the coating layers 2I from being caused by heat resulting from TIG welding.

Modification to the Embodiment

Figure 9A:
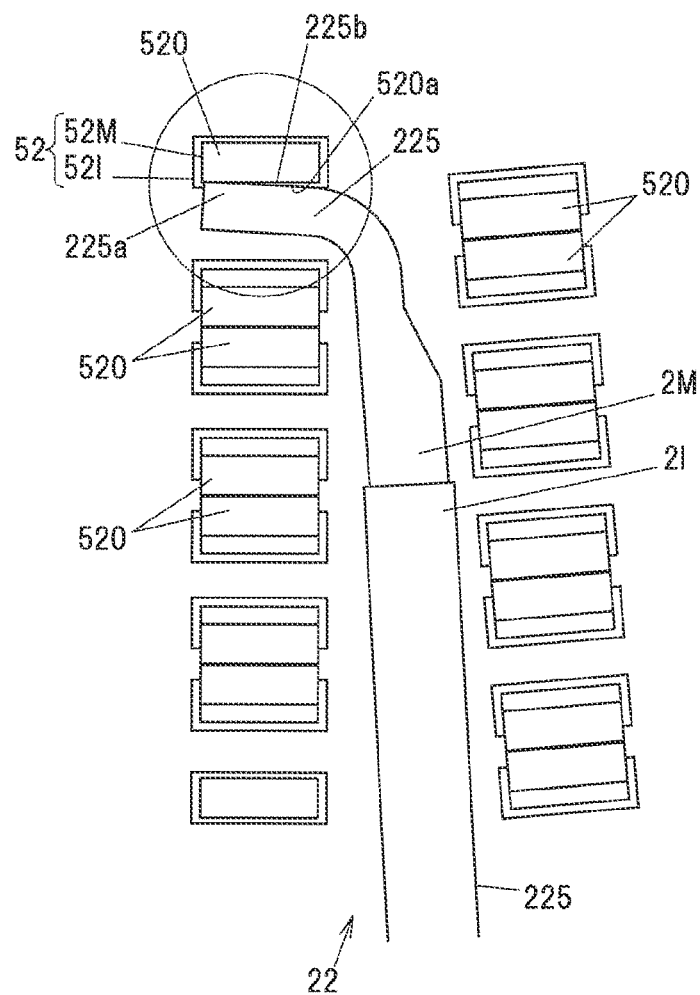
FIG. 9A is an axial direction view showing a modification showing a joining portion and a radial direction extension portion of a second U phase lead wire together with coil ends of a plurality of coil pieces.

FIG. 9A is an axial direction view showing a modification in which, when the joining portion 225 of the second U phase lead wire 22 is welded to the corresponding coil end 520, the opposite surface 225b of the joining portion 225 to the coil end 520 is brought contiguous obliquely to the side surface 520a of the coil end 520. In FIG. 9A, the same reference characters are being assigned to the constituent elements common to those described with reference to FIG. 8 and the duplicated descriptions thereof are omitted.

Figure 9B:
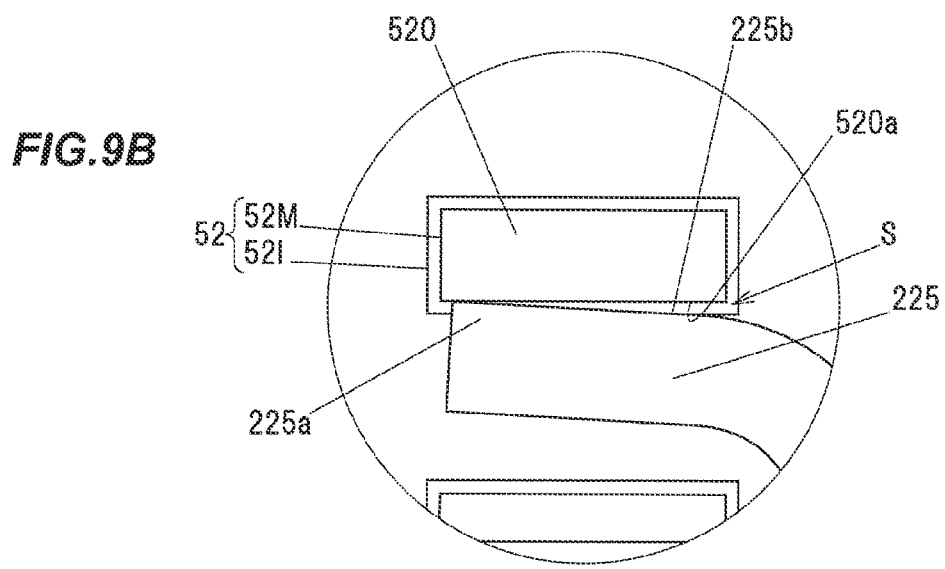
FIG. 9B is an enlargement of the circled portion of FIG. 9A.

In the embodiment described with reference to FIG. 8, it has been described that when the joining portion 225 of the second U phase lead wire 22 is welded to the corresponding coil end 520, the opposite surface 225b of the joining portion 225 to the coil end 520 is brought into surface contact with the side surface 520a of the coil end 520, but in the modification shown in FIG. 9A, the opposite surface 225b of the joining portion 225 is inclined with respect to the radial direction when viewed in the axial direction, and at one end portion in the extending direction of the joining portion 225, the opposite surface 225b of the joining portion 225 is brought contiguous to the side surface 520a of the coil end 520, while at the other end portion in the extending direction of the joining portion 225, there is formed a gap S between the opposite surface 225b of the joining portion 225 and the side surface 520a of the coil end 520. This configuration best seen in FIG. 9B allows the molten metal resulting from the melting of the coil end 520 during TIG welding to flow into the gap S, and thereby more securely weld the joining portion 225 and the coil end 520 together.

SUMMARY OF THE EMBODIMENTS

Next, the technical ideas grasped from the above-described embodiments will be described with the aid of the reference characters and the like in the embodiments. It should be noted, however, that each of the reference characters and the like in the following descriptions is not to be construed as limiting the constituent elements in the claims to the members and the like specifically shown in the embodiments.

[1] An electrical distribution member (2), comprising: a plurality of electrical conducting wires (lead wires 21 to 26) each being made of a solid wire, to connect a plurality of coil ends (520), which are protruding in an axial direction from a stator core (51) of a rotating electrical machine (1), and electrodes (31, 32, and 33), respectively, of a terminal block (3) together, the plurality of electrical conducting wires (lead wires 21 to 26) each including an electrical conducting body (2M), which is made of an electrically conductive metal, and a coating layer (2I), which is being provided over a surface of that electrical conducting body (2M), while being removed therefrom over a range of a predetermined length including a joining portion (214, 225, 234, 245, 254, 265) to be welded to the coil end (520), wherein the plurality of electrical conducting wires (lead wires 21 to 26) include at least one first electrical conducting wire (21, 23, 25), which has the joining portion (214, 234, 254) extending in the axial direction of the stator core (51), and at least one second electrical conducting wire (22, 24, 26), which has the joining portion (225, 245, 265) being bent in relation to a radial direction of the stator core (51) in such a manner as to follow a circumferential direction of the stator core (51), wherein the predetermined length ($L_1$) of the at least one second electrical conducting wire (22, 24, 26) with the coating layer (2I) being removed therefrom is longer than the predetermined length ($L_2$) of the at least one first electrical conducting wire (21, 23, 25) with the coating layer (2I) being removed therefrom.

[2] The electrical distribution member (2) according to [1] above, wherein, for each of the at least one second electrical conducting wires (22, 24, 26), the joining portion (225, 245, 265) is joined to the coil end (520) in an inner side in the radial direction of the stator core (51) relative to the joining portion (214, 234, 254) of each of the at least one first electrical conducting wires (21, 23, 25), wherein the second electrical conducting wire (22, 24, 26) includes a radial direction extension portion (224, 244, 264) extending in the radial direction of the stator core (51), wherein the joining portion (225, 245, 265) is bent at an end portion of the radial direction extension portion (224, 244, 264) in the inner side in the radial direction of the stator core (51), wherein an angle (the angle θ) formed by an opposite surface (225b) of the joining portion (225, 245, 265) to the coil end (520) and the radial direction extension portion (224, 244, 264) is an obtuse angle.

[3] The electrical distribution member (2) according to [1] or [2] above, wherein, for each of the at least one second electrical conducting wires (22, 24, 26), when the joining portion (225, 245, 265) is welded to the coil end (520), an opposite surface (225b) of the joining portion (225, 245, 265) to the coil end (520) is brought contiguous obliquely to a side surface (520a) of the coil end (520).

Although the embodiments of the present invention have been described above, the above described embodiments are not to be construed as limiting the inventions according to the claims. Further, it should be noted that not all the combinations of the features described in the embodiments are indispensable to the means for solving the problem of the invention.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An electrical distribution member, comprising:
a plurality of electrical conducting wires each being made of a solid wire, configured to be connected to a plurality of coil ends, which are protruding in an axial direction from a stator core of a rotating electrical machine, a first holding portion for holding the plurality of electrical conducting wires, the plurality of electrical conducting wires each including an electrical conducting body, which is made of an electrically conductive metal, and a coating layer, which is being provided over a surface of that electrical conducting body, while being removed therefrom over a range of a predetermined length including a joining portion to be welded to the coil end, wherein the plurality of electrical conducting wires include at least one first electrical conducting wire, which has the joining portion extending in the axial direction of the stator core, and at least one second electrical conducting wire, which has the joining portion being bent in a direction intersecting with an extending direction of the joining portion of the at least one first electrical conducting wire, wherein the predetermined length of the at least one second electrical conducting wire with the coating layer being removed therefrom is longer than the predetermined length of the at least one first electrical conducting wire with the coating layer being removed therefrom.

2. The electrical distribution member according to claim 1, further comprising:
a second holding portion for holding a part of the plurality of electrical conducting wires,
wherein the first holding portion and the second holding portion are being coupled together with a coupling portion.

3. The electrical distribution member according to claim 2, wherein the first holding portion is provided at a position separated from the stator core.

4. The electrical distribution member according to claim 1, wherein the first holding portion is provided at a position separated from the stator core.

5. An electrical distribution member, comprising:
a plurality of electrical conducting wires each being made of a solid metal wire, configured to be connected to a plurality of coil ends, which are protruding in an axial direction from a stator core, the plurality of electrical conducting wires each including a coating layer provided over a surface of the wire, the coating layer being removed from a portion of the wire over a range of a predetermined length that includes a joining portion configured to be welded to one of the coil ends, wherein the plurality of electrical conducting wires include at least one first electrical conducting wire, in which the joining portion extends in the axial direction of the stator core, and at least one second electrical conducting wire, in which the joining portion is bent in a direction intersecting with an extending direction of the joining portion of the at least one first electrical conducting wire, wherein the predetermined length of the portion of the wire with the coating layer removed is longer for the at least one second electrical conducting wire than for the at least one first electrical conducting wire.

6. The electrical distribution member according to claim 5, further comprising a first holding portion for holding the plurality of electrical conducting wires.

7. The electrical distribution member according to claim 6, further comprising:
a second holding portion for holding a part of the plurality of electrical conducting wires,
wherein the first holding portion and the second holding portion are being coupled together with a coupling portion.

8. The electrical distribution member according to claim 6, wherein the first holding portion is provided at a position separated from the stator core.

9. The electrical distribution member according to claim 6, wherein the first holding portion is provided at a position separated from the stator core.

10. The electrical distribution member according to claim 5, wherein, for each of the at least one second electrical conducting wires, the joining portion is joined to the coil end in an inner side in the radial direction of the stator core relative to the joining portion of each of the at least one first electrical conducting wires, and wherein the second electrical conducting wire includes a radial direction extension portion extending in the radial direction of the stator core.

11. The electrical distribution member according to claim 10, wherein the joining portion is bent at an end portion of the radial direction extension portion in the inner side in the radial direction of the stator core, wherein an angle formed by an opposite surface of the joining portion to the coil end and the radial direction extension portion is an obtuse angle.

12. The electrical distribution member according to claim 5, wherein, for each of the at least one second electrical conducting wires, when the joining portion is welded to the coil end, an opposite surface of the joining portion to the coil end is brought contiguous obliquely to a side surface of the coil end.

* * * * *